United States Patent
Deaver, Sr.

(10) Patent No.: US 8,508,070 B2
(45) Date of Patent: Aug. 13, 2013

(54) SYSTEM, DEVICE AND METHOD FOR REGULATING VOLT-AMPERE REACTANCE IN A POWER DISTRIBUTION SYSTEM

(75) Inventor: Brian J. Deaver, Sr., Fallston, MD (US)

(73) Assignee: S&C Electric Company, Chicago, IL (US)

( * ) Notice: Subject to any disclaimer, the term of this patent is extended or adjusted under 35 U.S.C. 154(b) by 672 days.

(21) Appl. No.: 12/690,604

(22) Filed: Jan. 20, 2010

(65) Prior Publication Data
US 2011/0169461 A1 Jul. 14, 2011

Related U.S. Application Data

(60) Provisional application No. 61/294,915, filed on Jan. 14, 2010.

(51) Int. Cl.
*H02J 1/10* (2006.01)

(52) U.S. Cl.
USPC .......................................................... 307/29

(58) Field of Classification Search
USPC .......................................................... 307/29
See application file for complete search history.

(56) References Cited

U.S. PATENT DOCUMENTS

| | | | |
|---|---|---|---|
| 4,055,795 A | 10/1977 | Mathieu | |
| 4,769,587 A | 9/1988 | Pettigrew | |
| 5,736,838 A | 4/1998 | Dove et al. | |
| 6,147,475 A | 11/2000 | Bridgeman | |
| 6,462,519 B1 | 10/2002 | McDaniel et al. | |
| 6,917,888 B2 | 7/2005 | Logvinov et al. | |
| 7,091,703 B2 | 8/2006 | Folts et al. | |
| 2002/0101743 A1 | 8/2002 | Kallus et al. | |
| 2002/0180408 A1 | 12/2002 | McDaniel et al. | |
| 2003/0103303 A1 | 6/2003 | Barnes et al. | |
| 2003/0160595 A1 | 8/2003 | Provanzana et al. | |
| 2004/0164718 A1 | 8/2004 | McDaniel et al. | |
| 2004/0260488 A1 | 12/2004 | Al-Hamrani | |
| 2006/0195229 A1 | 8/2006 | Bell et al. | |
| 2006/0250117 A1 | 11/2006 | Rayburn | |
| 2007/0024264 A1 | 2/2007 | Lestician | |
| 2007/0185665 A1 | 8/2007 | Roytelman | |
| 2008/0010549 A1* | 1/2008 | Coolidge et al. ................ 714/44 |
| 2008/0106241 A1 | 5/2008 | Deaver et al. | |
| 2009/0231764 A1 | 9/2009 | Banting et al. | |
| 2010/0037189 A1 | 2/2010 | Bickel | |
| 2011/0071695 A1* | 3/2011 | Kouroussis et al. .......... 700/295 |

* cited by examiner

*Primary Examiner* — Robert L. Deberadinis

(57) ABSTRACT

A system, method and product for modifying the volt-ampere reactive (VARs) in a power distribution system is provided. In one embodiment, the method includes determining the VARs at a location on the power distribution system and based on the determined VARs, determining whether to modify the VARs. If it is determined to modify the VARs the method includes identifying a plurality a capacitor banks connected to a power line and from the identified plurality of capacitor banks, generating a list of eligible capacitor banks that satisfy inclusion criteria. If the list of eligible capacitor banks includes at least one capacitor bank the method includes selecting a capacitor bank from the list of eligible capacitor banks and transmitting a switching command for the selected capacitor bank. Generating the list of eligible capacitor banks may include one or more of ensuring the voltage at each capacitor bank is not beyond a threshold, ensuring the total harmonic distortion at each capacitor bank is not beyond a threshold, ensuring the capacitor bank has not been switched within a recent predetermined time period, ensuring the capacitor bank has not been switched more than a predetermined number of times within a recent time period, ensuring that communications with each capacitor bank are viable, and other criteria.

30 Claims, 9 Drawing Sheets

SYSTEM, DEVICE AND METHOD FOR REGULATING VOLT-AMPERE REACTANCE IN A POWER DISTRIBUTION SYSTEM

CROSS REFERENCE TO RELATED APPLICATIONS

This application claims priority to U.S. Provisional Patent Application No. 61/294,915, filed Jan. 14, 2010, which is incorporated herein by reference in its entirety for all purposes.

FIELD OF THE INVENTION

The present invention generally relates to devices, systems, and methods for improving the efficiency of power delivered by power lines, and more particularly relates to devices, systems, and methods for regulating the power factor of a power distribution system.

BACKGROUND OF THE INVENTION

The power system infrastructure includes power lines, transformers and other devices for power generation, power transmission, and power distribution. A power source generates power, which is transmitted along high voltage (HV) power lines for long distances. Typical voltages found on HV transmission lines range from 100 kilovolts (kV) to in excess of 800 kV. The power is stepped down to medium voltage (MV) power at regional substation transformers. MV power lines carry power through neighborhoods and populated areas. Typical voltages found on MV power lines power range from about 1000 V to about 100 kV. The power is stepped down further to low voltage (LV) levels by distribution transformers. LV power lines typically carry power having voltages ranging from about 100 V to about 600 V to customer premises. A power distribution system may include a group of MV power lines, LV power lines, distribution transformers, and other power monitoring and control devices within a given region.

One parameter that may be measured at various locations within a power transmission and distribution system is the power factor. Power factor is the ratio of real power to apparent power, and may be measured for example for a given MV power line. Real power measures the ability of a network load to perform work in a particular time, and is associated with power consumption by a resistive load. Apparent power is the product of voltage and current, and may be equal to or greater than the real power due to a reactive load. In a purely resistive circuit, voltage and current waveforms are in phase with each other, changing polarity at the same instant in each cycle. In such a circuit the power factor is one (the real power and apparent power are the same).

In a circuit having a reactive load, such as a circuit having a capacitive or inductive load, there may be a time difference (a phase delay) between the current and voltage waveforms of the alternating current (AC) power. In particular, the capacitive and/or inductive loads (collectively "reactive loads") alternately store and release energy and may alter the phase between current and voltage. In such a circuit the power factor may be less than one.

Power lines may carry more current than otherwise necessary to provide power to portions of a power distribution network having reactive loads. The additional current may result in additional real power losses caused by the losses of the power lines in conducting the additional current and also may require the generating facility to produce more power.

Generally, it is undesirable for portions of a power distribution network to have a power factor that is significantly less than one. Production of such excess power in such circumstances is inefficient and is inconsistent with policies of conserving energy and preserving environmental resources. Further, in order to distribute the increased apparent power, the utility may need to build additional infrastructure (e.g., power lines) to carry the additional current to deliver the desired real power. Further, consumer utility meters typically measure only real power and consumers are charged for real power consumption. However, the cost of delivering power determines power rates. Thus, power utility rates may increase to reflect the utility company's cost of delivering the higher apparent power. Accordingly, there is a need to regulate the power factor of a power distribution system to thereby enable the power distribution system to operate in a more efficient manner. These and other needs are addressed by various embodiments of the present invention.

SUMMARY OF THE INVENTION

The present invention provides a system, method and product for modifying the volt-ampere reactive (VARs) in a power distribution system. In one embodiment, the method includes determining the VARs at a location on the power distribution system and based on the determined VARs, determining whether to modify the VARs. If it is determined to modify the VARs the method includes identifying a plurality a capacitor banks connected to a power line and from the identified plurality of capacitor banks, generating a list of eligible capacitor banks that satisfy inclusion criteria. If the list of eligible capacitor banks includes at least one capacitor bank the method includes selecting a capacitor bank from the list of eligible capacitor banks and transmitting a switching command for the selected capacitor bank. Generating the list of eligible capacitor banks may include one or more of ensuring the voltage at each capacitor bank is not beyond a threshold, ensuring the total harmonic distortion at each capacitor bank is not beyond a threshold, ensuring the capacitor bank has not been switched within a recent predetermined time period, ensuring the capacitor bank has not been switched more than a predetermined number of times within a recent time period, ensuring that communications with each capacitor bank are viable, and other criteria.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF ILLUSTRATIVE EMBODIMENTS

Figure 1:
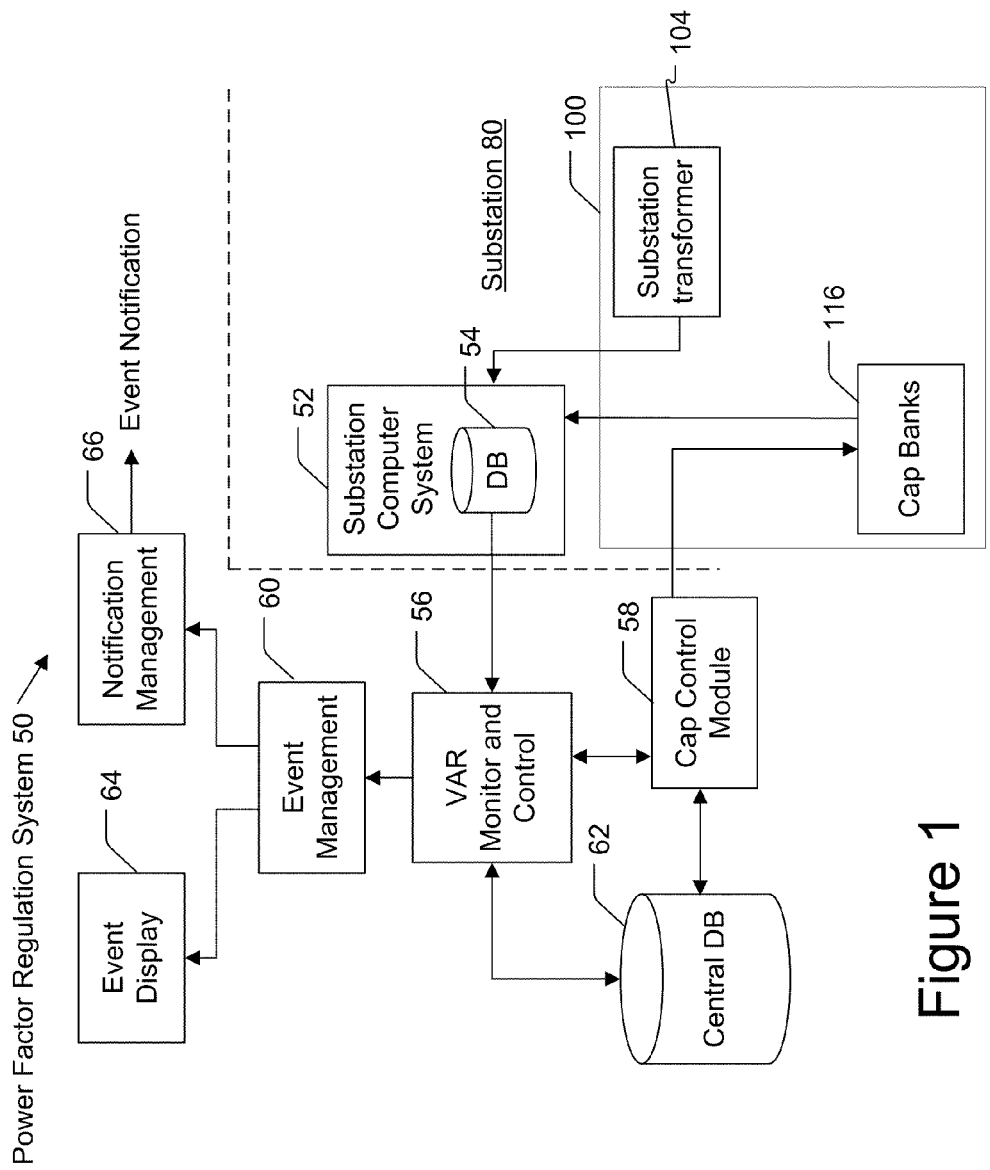
FIG. 1 is a diagram of an exemplary power factor regulation system in accordance with an example embodiment of the present invention.

In the following description, for purposes of explanation and not limitation, specific details are set forth, such as particular networks, communication systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, communication systems, computers, terminals, devices, components, techniques, data and network protocols, software products and systems, operating systems, development interfaces, and hardware are omitted so as not to obscure the description of the present invention.

The present invention may be implemented with numerous general purpose or special purpose computing system environments or configurations. For example purposes only, computing systems, environments, and configurations that may be suitable for use with the present invention include, but are not limited to, personal computers, server computers, handheld computing devices, laptop computing devices, notebook computing devices, multiprocessor computer systems, networked PCs, minicomputers, mainframe computers, and distributed computer systems that may include any of the above systems or devices, and the like.

The present invention may be described in the general context of computer-executable instructions, such as program modules, being executed by a computer system. Generally, program modules include program code, routines, programs, objects, components, data structures, etc. that perform particular tasks or implement particular abstract data types. The present invention also may be practiced in distributed computing environments where tasks are performed by remote processing devices that communicate through a communications network. In a distributed computing environment, program modules (and data structures) may be located in both local and remote computer storage media. Thus, a computers system as used herein may comprise one or more computers that may be co-located or distributed.

According to an example embodiment of the present invention, a system, device and method for regulating the power factor of a power distribution system controls which capacitor banks are engaged at any given time to vary voltage-ampere reactance (VAR)—the reactive power—for a given portion of the power line distribution system such as a substation bus or the power lines coupled to a substation transformer. Regulating the power factor, as used herein, generally equates to reducing the VARs.

To vary the phase relationship of the current and voltage, and thus the power factor, capacitor banks may be switched in or out of a medium voltage (MV) power line circuit so as to bring the power factor closer to one. Capacitor banks also may be located at the substation. Most loads connected to the power distribution system are inductive. The capacitor banks provide a reactive load and may be used to offset the inductive loads connected to the power distribution system. By bringing the power factor closer to one, less current is needed for the given quantity of real power. In addition, transmission losses are reduced and power distribution efficiency is improved.

FIG. 1 depicts an example system 50 for regulating the power factor of one or one power lines coupled to a power substation transformer 104 or the substation bus, according to an example embodiment of the present invention. The substation transformer 104 may be located at a power substation 80. A computer system 52 may be located at or near the substation 80 and include a power line database 54 (e.g., a real time data base) for storing status, configuration and measurement data pertaining to power distribution in areas served by the substation 80. For example, the database 54 may store status, configuration and measurement data for capacitor banks 116 and corresponding sensors. In addition, the real time database 54 (or other storage medium) may store information identifying each capacitor bank 116 (e.g., a serial number or address), information used for communicating with each capacitor bank 116 (e.g., a MAC address), information identifying the MV power line to which each capacitor bank is connected (e.g. circuit three, phase B), information of the location of each capacitor bank (e.g., distance away from the substation (relative to the other capacitor banks connected to the same MV power line such as the first, third, fourth, or seventh most distant), priority information for switching each capacitor in or out, capacitor bank ratings, and various other information about the capacitor banks.

The system 50 also may include other computer systems that may be located at a monitoring and control center or other location. For example, a utility company, contractor or other service provider may operate a power monitoring and control system. One application of the monitoring and control system may include a set of processes for regulating power factor (i.e., reducing VARs) for portions of a power transmission and distribution network. In an example embodiment, the monitoring and control system may include a volt-amperes reactive (VAR) monitoring and control module 56, a capacitor bank control module 58, and an event management module 60. The various modules may store and retrieve data from a central database 62. Data received from the real time database 54 may be processed by the VAR monitoring and control module 56 to determine whether action is to be taken. Thus, in some embodiments processes of the present invention may be performed by the VAR monitor and control module 56, which may be remote from the substation 80. Specific events may be recorded during processing and displayed by an event display module 64. Also, notifications of specific events may be sent to technicians, operators, or other service providers by a notification management module 66. When an action is to be taken to change the configuration of capacitor banks, commands may be generated by the capacitor bank control module 58. Such commands may be sent to the capacitor bank 116 that is being switched using various means. For example, commands may be communicated to the substation computer system 52 and re-transmitted (or otherwise sent) to the capacitor bank 116. In another example, respective communication devices may be coupled to capacitor banks 116 and receive the command. Various protocols (e.g. DNP 3.0, IEC61850, etc.) and communication mediums (e.g., wired (DSL, fiber, coax, twisted pair, etc.), wireless, power line) may be used for communicating with the capacitor banks in various embodiments. The VAR monitor and control module 56, capacitor bank control module 58, event display module 64, event management module 60, and the notification management module 66 each may comprise executable program code stored on a computer system and that computer system may operate to regulate the power factor of power line connected to a plurality of substations 80.

Figure 2:
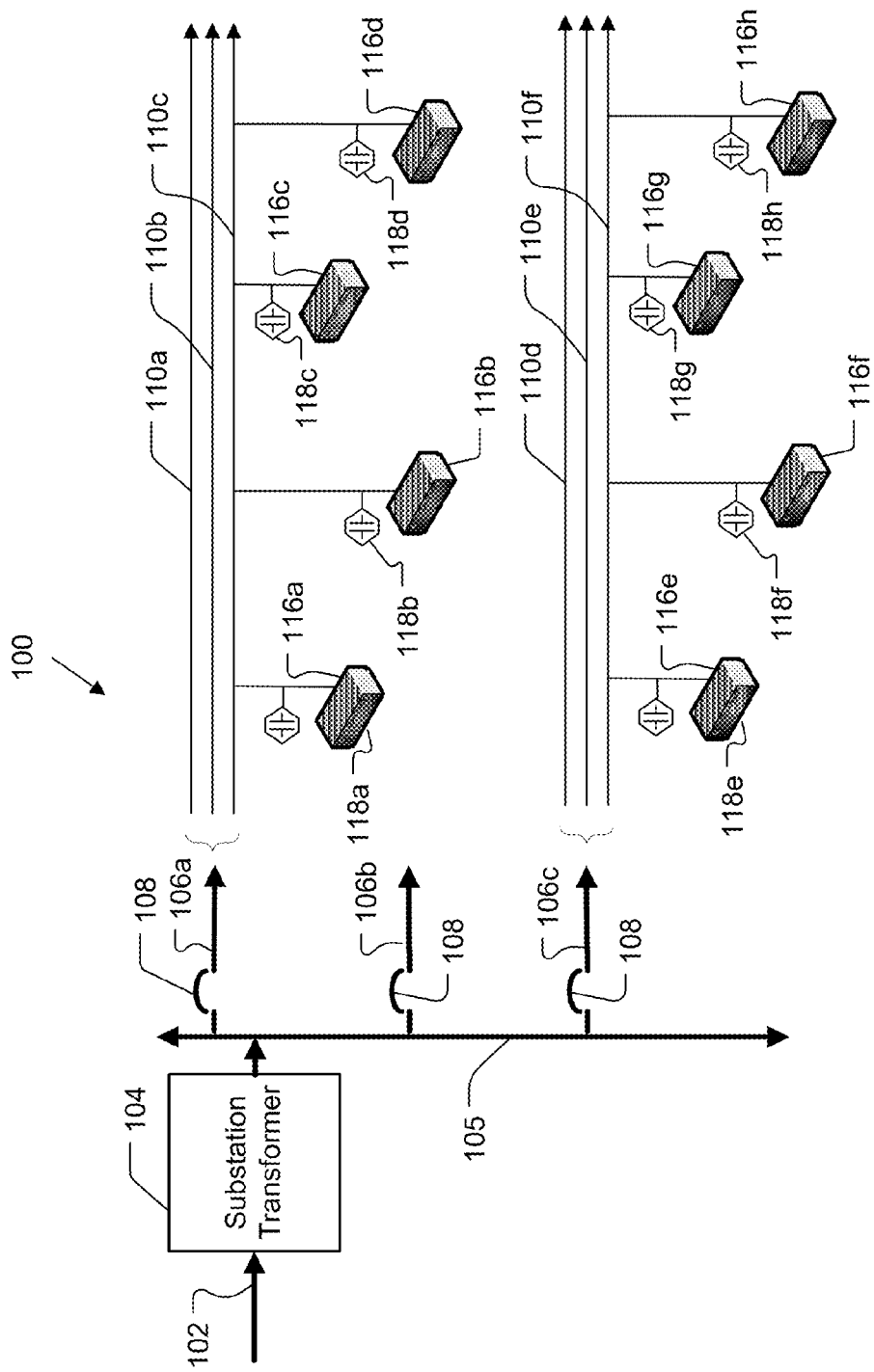
FIG. 2 is a diagram of a portion of a power distribution system with which an example embodiment of the present invention may be used.

FIG. 2 depicts a portion 100 of a power distribution system for which the power factor may be regulated. A high voltage power line 102 may be coupled to a regional substation transformer 104. In an example embodiment, the substation transformer 104 may step down the high voltage from the HV power line 102 to medium voltage for distribution. One or more MV power line circuits 106 may be coupled to the substation transformer 104 via a substation bus 105. Each MV power line circuit 106 is coupled to the substation bus 105 by a respective circuit breaker 108. Each MV power line circuit 106 is comprised of three MV power line conductors in a three phase power system and may extend to a network of distribution transformers (not shown) which step down the medium voltage further to low voltage power which is propagated along low voltage (LV) power lines (not shown) to the customer premises.

Two of the MV power line circuits 106 are shown in detail with each circuit 106 having three MV power line conductors 110 (also referred to herein as MV power lines). The three MV power conductors 110 may propagate three phase MV power, in which each conductor 110 carries power with a different phase as is common in the United States. Various capacitor banks 116 may be connected, respectively, to each MV power line conductor 110. Each capacitor bank 116 may include a group of capacitors that, when engaged, are electrically connected to each of the power line conductors 110. In some embodiments, the capacitor banks 116 may allow connection of a capacitor bank to single power line conductor (of the three) and in other embodiments, the capacitor banks 116 are connected (engaged) or not connected to all three of the power line conductors. Each capacitor bank 116 may be connected to the MV power line 110 at a different location. In addition, one or more sensors 118 may be coupled to the MV power line in the vicinity of a corresponding capacitor bank 116. A given sensor 118a, for example, may measure current, voltage, phase, VARs and/or power factor of the power propagating along a MV power line conductor 110a to which a corresponding capacitor bank 116a is coupled. Sensors also may be located elsewhere. For example another sensor may measure VAR supplied to the bus 105 by the substation 104 and at the circuit breaker 108 (supplied to the MV circuit). In some embodiments, the sensor 118 may be form part of the capacitor bank 116. Sensors also may be located at a power usage meter at one or more power customers. While FIG. 2 depicts capacitor banks 116 (and sensors 118) being connected to only one power line conductor 110c and 110f of MV power line circuits 106a and 106c, respectively, in practice each capacitor bank 116 (and sensors 118) is typically connected to all three power line conductors 110. Sensors may also monitor the total harmonic distortion (THD), the voltage, the active load, the VARs, the total power, and the power factor on the HV side (102) and the MV side (e.g., 105) of each substation transformer 104. Status information of each capacitor bank and the load tap changer (LTC) tap positions of the substation transformers 104 may be collected and stored.

According to an example embodiment of the present invention, data is gathered for each capacitor bank 116, including measurements from the corresponding sensor(s) 118. Such data may be used to determine which capacitor banks 116 to switch in or out of its corresponding MV circuit 106 in order to alter (e.g., reduce) the VAR and improve power factor. Select criteria may be implemented to determine which capacitor bank(s) 116 are to be selected for switching. While only one bus is illustrated in FIG. 2, a substation may include a plurality of buses that are independently monitored and controlled.

Figure 3:
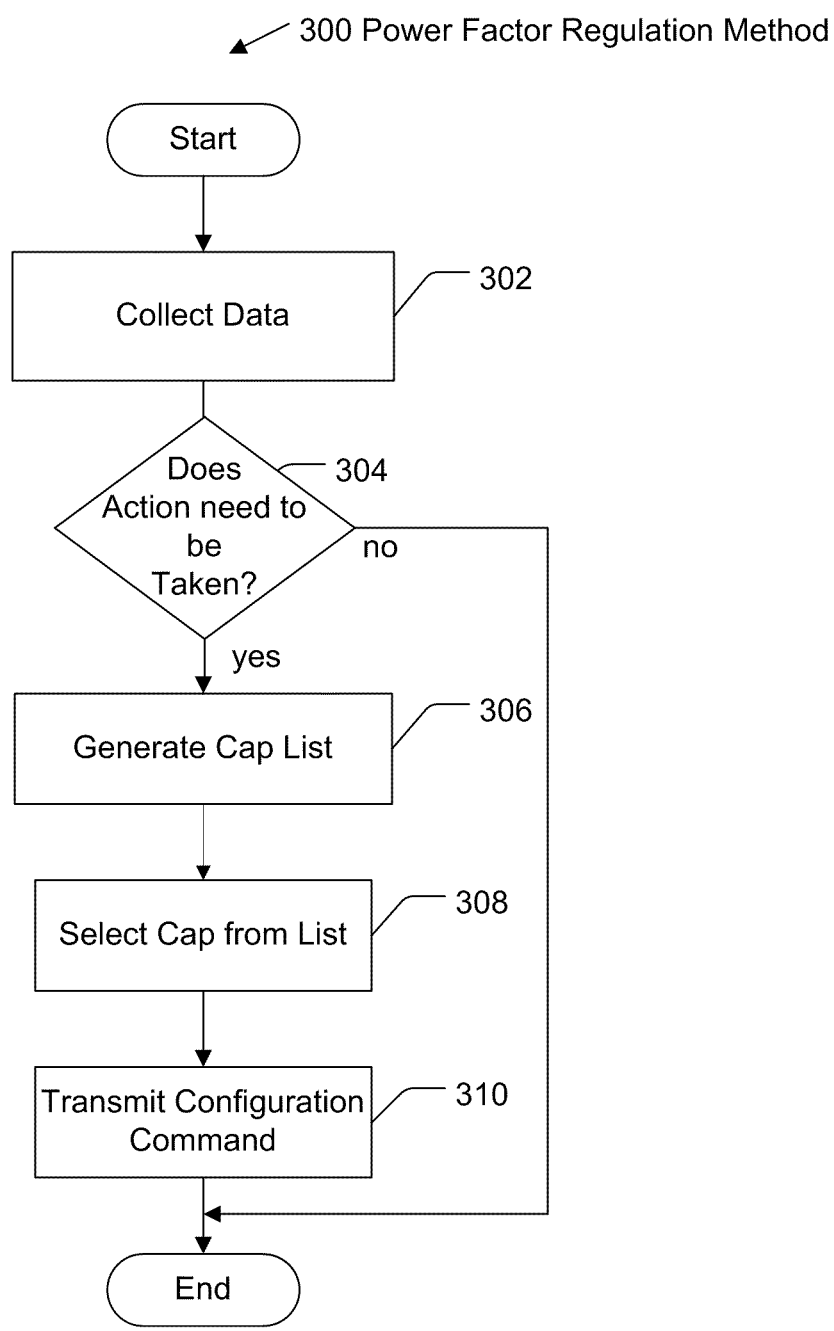
FIG. 3 is a flow chart of a power factor regulation method in accordance with an example embodiment of the present invention.

FIG. 3 depicts an overview of a process for providing power factor regulation 300, according to an example embodiment of the present invention. At 302, one or more data collection processes may be implemented to obtain network configuration data, network model data, and power distribution parameter data. The network referred to may encompass the transformers, power lines, sensors, capacitor banks and other devices forming a portion 100 (see FIG. 2) of the power distribution system. Accordingly, the network configuration data may include information about the transformers, power lines, sensors and other devices included within the network. The network model data may include mathematical models for simulating various devices or groups of devices. The power distribution parameter data may include sensor data from the sensors 118, along with sensor data from other sensors within the network. For example, there may be various sensors at a substation to monitor the power at the substation transformer 104, at (supplied to) the bus 105, and other substation components. The collected data may also include information identifying the engagement status of each capacitor bank 116 (switched in or out), the viability of communications with each capacitor bank 116, the voltage at each capacitor bank 116, the VARs flowing through a power line at each capacitor bank, the total harmonic distortion at each capacitor bank, the mode of each capacitor bank (e.g., automated or manual), the number of configuration changes within a recent time period for each capacitor bank, the VARs supplied to each MV power line circuit and/or conductor, the power factor of the power supplied to each MV power line, the time elapsed since the most recent configuration change for each capacitor bank, and/or various other data. In some embodiments, the data is only collected for a subset of all the capacitor banks 117 such as those capacitor banks 116 connected to a particular MV power line conductor 110 or MV circuit 106.

At step 304, one or more decision processes may be implemented to determine whether any network configuration actions are desired or needed. For example, the volt-amperes reactive (VAR) supplied to the bus 105 and/or the various MV power line circuits 106 (in which case the VARs supplied to the power line conductors of the MV circuit may be averaged) may be evaluated. VAR (or the power factor) may be compared to a threshold to determine whether the power factor is to be adjusted to improve power distribution efficiency. Additional or alternative decision actions may be made. If no actions are desired, then a given iteration of the method 300 ends (and may be repeated at process 302).

When an action is desired, additional processes may be performed. At 306, a process may be performed to generate a capacitor bank list, which comprises a list of capacitor banks 116 that are eligible to be switched in to or out of a given MV power line circuit 106 to bring the power factor closer to one. The list of eligible capacitor banks may start with all the capacitor banks connected to a particular MV power line conductor 110, MV power line circuit 106, or substation 80 and be generated based on the engagement status of each capacitor bank 116 (e.g., exclude those switched in if need to switch out a capacitor bank), the viability of communications with each capacitor bank 116 (e.g., exclude those without viable communications), the voltage of the power at each capacitor bank 116 (e.g., exclude those with a voltage beyond a threshold (i.e., outside a voltage range)), the total harmonic distortion (THD) of the power at each capacitor bank (e.g., exclude those where the THD is beyond a threshold), the mode of each capacitor bank (e.g., exclude those in manual mode), the number of configuration changes within a recent time period for each capacitor bank (e.g., exclude those with a quantity of changes over a recent time period above a threshold), the time elapsed since the most recent configuration change for each capacitor bank (e.g., exclude those for which the time elapsed is less than a minimum wait period), and/or various other data. At 308, a specific capacitor bank 116 from the generated capacitor bank list may be selected such as, for example, based on a priority value associated with each of the capacitor banks of the list. At 310, configuration commands may be transmitted to the selected capacitor bank 116 to switch the selected capacitor bank in or out of a given MV power line circuit 106. The power factor (and VARs) at one or more locations of the MV power line circuit 106 typically will change based on the new configuration.

Because the network load being served downstream of the MV power line circuit 106 may vary over time, the power factor also may vary over time. Accordingly, on the next iteration of the method 300, the results of the decision action processes performed at step 304 may differ. The method 300 may be performed periodically, such as every minute, five minutes, hour, five hours, or day. Further, in some embodiments the method in addition, or alternatively, may be performed aperiodically (e.g., in response to a change in the current, or when the current crosses a predetermined threshold). Although the method is described as switching a capacitor bank in or out of a MV power line circuit 106, in an alternative embodiment, a capacitor bank 116 may be controlled to vary its capacitance among multiple capacitance values (e.g., by switching in and out various capacitors within the capacitor bank).

Although the method 300 is performed to switch capacitor banks in or out so as to improve power factor (and/or reduce VARs), the capacitor banks 116 also may be switched to vary the power line voltage. For example, when the MV power line voltage falls below a first voltage level, a capacitor bank may be switched into the circuit 106 and when the MV power line voltage rises to a second voltage level, the capacitor bank 116 may be switched out of the MV circuit 106. It is when the a capacitor bank's voltage is within the band defined by the first and second voltage (where no change is being made), that the process 300 may find a capacitor bank eligible and switch the capacitor bank in or out of the MV power line circuit to improve the power factor.

Figure 4:
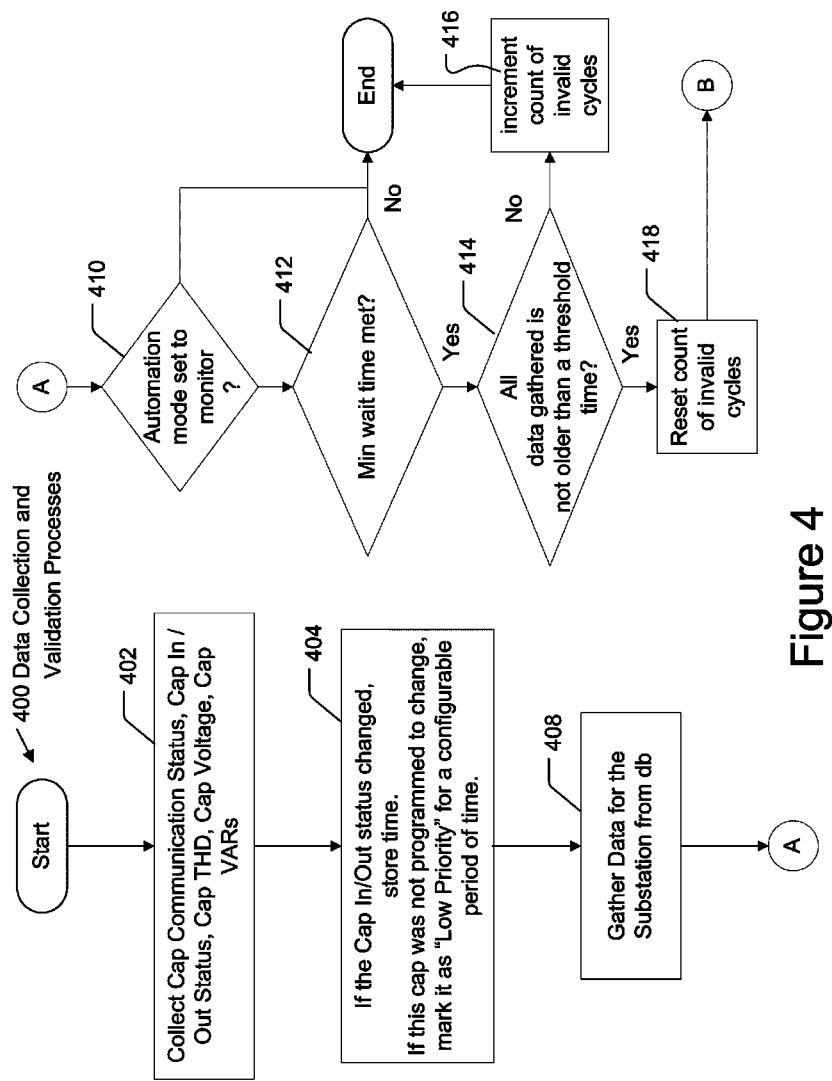
FIG. 4 is a flow chart of a data collection process for use in regulating power factor, in accordance with an example embodiment of the present invention.

FIGS. 4-8 depict details of examples of the processes illustrated in FIG. 3. FIG. 4 depicts a data collection and validation process 400 that may be implemented according to an example embodiment of the present invention. In this example embodiment the data collection process 400 may be executed every five minutes for each MV power line circuit 106 of each substation transformer 104 (when enabled).

At 402 capacitor data is collected for each capacitor bank 116 and, in embodiments, other locations on the power distribution system such as the substation bus. In some instances data may not be available for all capacitor banks 116. The gathered data may include a communication status (whether viable communications with the capacitor bank are available or not), engagement status (i.e., switched in or out), data of a measurement of the total harmonic distortion at the capacitor bank 116, data of the measured MV voltage of the power at the capacitor bank 116, and data of the measured VAR of the power at each capacitor bank 116. In an example embodiment, one or more sensors 118 may be coupled to the MV power line circuit 106, such as at a capacitor bank 116 to measure voltage, VAR, and total harmonic distortion of the power of one or more power line conductors. In some instances, the capacitor bank 116 may include the sensors 118 and modem for communicating the requested data. Further, the capacitor bank engagement status may be monitored to indicate the engagement status, and a communication device (e.g., a modem) used for transmitting the gathered data may indicate a communication status for a given capacitor bank 116. The gathered data may be stored in a real time database 54, such as may be located in a computer system 52 at a substation or elsewhere. The data may be gathered using any of various protocols (e.g. DNP 3.0, IEC61850, etc.) and transmitted via various media (e.g., wired, cable, wireless, power line).

At 404 a time stamp may be recorded indicating when the capacitor bank engagement status (i.e., when the capacitor bank has switched in or out) has changed. For example, a processor at the local substation may compare the engagement status of each capacitor bank each time sensor data is gathered with the previous engagement status (stored in memory). When engagement of a capacitor bank 116 changes, the time of change (i.e., when the change is detected) is stored in memory in association with information identifying the capacitor bank 116. It is worth noting that capacitor banks may be used to control voltage and MV power line voltage control may be implemented locally by each capacitor bank 116. More specifically, when the local MV voltage falls below a first threshold voltage, the capacitor bank may be programmed to switch in (i.e., engage) and when the voltage increases above a first threshold voltage (e.g., a different higher threshold), the capacitor bank 116 may be programmed to switch out (i.e., disengage). Thus, the collection of data will allow the computer system to detect when a capacitor bank has switched in or out. When the local MV voltage remains inside of the preferred voltage range (between the first and second threshold) the capacitor bank's engagement status typically will remain unchanged and the centralized VAR Control system may switch the capacitor bank 116 in or out to improve VARs (power factor) and/or THD. If an outside entity (SCADA or manual control) operates a capacitor bank, the present invention may be configured to recognize the change and recognize that the engagement status change did not originate from the present invention's automated control algorithm. In deference to that outside control mechanism, the present invention may accord the capacitor bank 116 whose engagement status changed a lower the priority for changing the engagement of that capacitor bank 116 (i.e., to reduce probability that the automated control algorithm will change the engagement status of that capacitor bank) for a configurable period of time. The lower priority data may be stored in memory (e.g., in the real time database) in association with the respective capacitor bank 116. A description of an example computer system for providing dynamic voltage regulation that may operate capacitor banks 116 is provided in U.S. application Ser. No. 12/424, 322, filed Apr. 15, 2009, U.S. Publ. No. 2009/0265042, entitled "System and Method for Providing Voltage Regulation in a Power Distribution System," which is hereby incorporated by reference in its entirety for all purposes.

During the following process, further validation may be performed for capacitor banks 116 for which data was able to be gathered at 402. At 408 data stored in the real time database 54 may be retrieved. At 410, based on the data from the real time database 54 and/or data from elsewhere, the process determines if an automation mode is set to Monitor Only (meaning that no automated capacitor changes are permitted). If the mode is set to Monitor Only, then subsequent validation processes need not be performed. If the mode is not set to Monitor Only (e.g., in manual or automatic mode), then for each capacitor bank 116 for which data was gathered, it is determined whether a predetermined minimum wait time has lapsed since the last the time the capacitor bank 116 was last switched (in or out). If the minimum wait time has not elapsed, then the capacitor bank is not eligible for being switched.

If the minimum wait time has not elapsed for a given capacitor bank 116, the process terminates for that capacitor bank 116 at 417. If the minimum wait time has elapsed, then at step 414 further data validation may be performed. Note that because there may be significant data to retrieve and process, and the data may need to be transmitted from a local storage to a central processing site, there may be a significant time lag between the time the measurements are made and process 400 is completed. If the total time lag for the gathered data is too long (e.g., exceeds a threshold time), then the gathered data may be considered invalid for purposes of determining whether to change the MV power line circuit 106 configuration. For example, the load conditions may have varied over time so that any change implemented based on the gathered data is unlikely to be useful for the then-current power factor of the MV power line circuit being regulated. If at 414 the total lag time (between data collection and the current time) exceeds a threshold duration, then this execution of the data collection and validation processes 400 is labeled as being an invalid cycle. The number of consecutive invalid cycles may be tracked, for example, to determine whether another communication configuration may be beneficial. Accordingly, at 416 the count of invalid cycles may be incremented. If at 414 the total lag time does not exceed the threshold time, then at 418 the count may be reset. In addition, the action decision process 500 may be performed.

Figure 5:
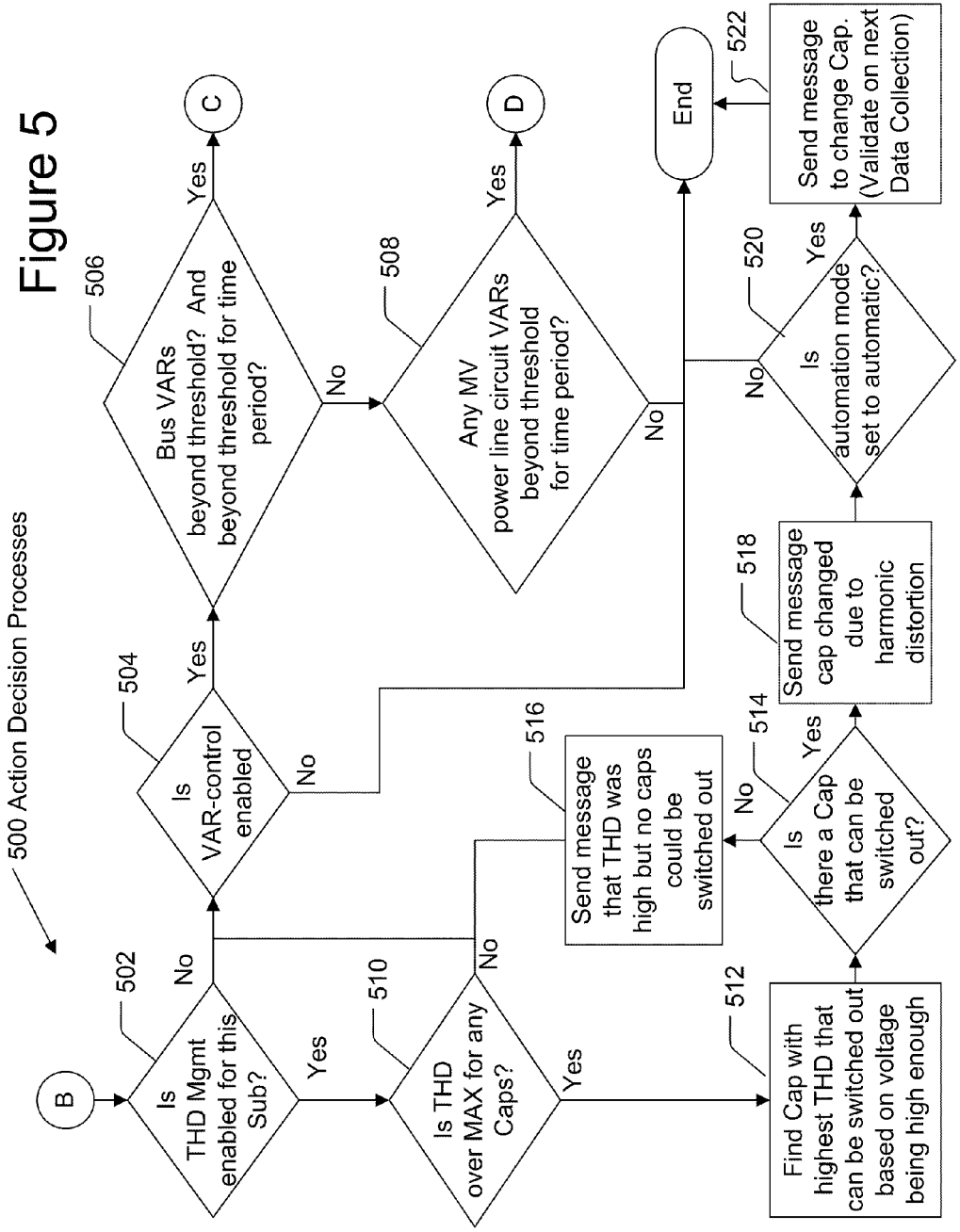
FIG. 5 is a flow chart of a action decision process for use in regulating power factor, in accordance with an example embodiment of the present invention.

FIG. 5 depicts an action decision process 500 that may be implemented for reducing VARs, according to an example embodiment of the present invention. The different actions that may be determined during an iteration may include for example: switching a capacitor bank 116 out of a circuit 106 because total harmonic distortion is too high; switching a capacitor bank 116 into or out of a circuit 106 to change reactance and reduce VARS; or indicating that an action is unable to be taken. In various embodiments, other decisions may be determined.

At 502 configuration data stored in memory is accessed to determine whether total harmonic distortion (THD) management is enabled for the substation. If THD management is not enabled, then at 504 configuration data stored in memory is accessed to determine whether VAR Control (e.g., power factor regulation) is enabled. If VAR Control is not enabled, then no action is to be taken and the process terminates. If VAR Control is enabled, then at 506 the value of the Bus VARs (the VARs supplied to the Bus by the substation transformer, which may comprise three values (one for each Bus phase) which may be averaged to provide the Bus VARs) is compared with a threshold VARs to determine if the Bus VARs is beyond the threshold and if so, the process confirms that the Bus VARs have been beyond the threshold for a predetermined time period. If the Bus VARs have been beyond the threshold for a predetermined time period, the process continues to generate a capacitor bank list (see FIG. 6). If the Bus VARs are not beyond the threshold or have not been beyond the threshold for a predetermined time period, the process continues to step 508. At 508 the process determines if the VARs of any MV power line circuits are beyond a threshold and have been so for a predetermined time period (by, for example, averaging the VARs supplied to the three MV power line conductors and comparing the averaged VARs to threshold value). If not, the process terminates. If the VARs of any MV power line circuit is beyond a threshold and has been so for a predetermined time period, the process continues to generate a capacitor bank list (see FIG. 7).

If at 502 it is determined that total harmonic distortion management is enabled, then at step 510 data of the measured THD at each capacitor bank 116 is compared with a maximum value (which may be the same or different for each capacitor bank) for any of the capacitor banks 116 for which data was able to be gathered (during the data gathering processes 400—see FIG. 4). If the maximum THD value has not been exceeded for any of the capacitor banks 116, then the process continues to 504. Further, if it is determined at 504 that the VAR Control is enabled, then the subsequent steps (e.g., steps 506 and/or 508), along with the capacitor list generation processes 600/700 and capacitor bank selection processes 800 may be performed.

If at 510 it is determined that the maximum THD value has been exceeded for any of the capacitor banks 116, then the process continues to 512 where the capacitor bank 116 having the highest associated THD that can be switched out (based on the voltage being high enough such as above the lower threshold) is identified. In some instances there may be a capacitor bank 116 that may be switched out of the circuit and in other instances, process 512 may determine that there is no capacitor bank 116 that can be switched out (because the voltages at the capacitor banks 116 are not above a threshold voltage). At 514 the determination of whether there is a capacitor bank that may be switched out is performed. If there is no capacitor bank 116 that may be switched out, then at 516 a message, alarm or other notification may be generated and transmitted and/or stored for access by a monitoring system (e.g., a power distribution monitoring and system). The notification may provide an indication that the THD was beyond a maximum THD value for one or more capacitor banks 116 (and identify those capacitor banks) but no capacitor bank 116 was (or could be) switched out. Also when there are no capacitor banks 116 that may be switched out as determined at 514, then process 504 may be performed. And, if it is determined at 504 that the VAR control is enabled, then subsequent steps (e.g., steps 506 and/or 508), along with the capacitor list generation processes 600/700 and capacitor bank selection process 800 may be performed.

If at 514 it is determined that there is a capacitor bank 116 that may be switched out, then at step 518 a message or other informational notification may be generated and transmitted and/or stored for access by the monitoring and control system. Such notification indicates that the maximum THD value has been exceeded and there is a capacitor bank 116 which may be switched out along with information identifying the identified capacitor bank (i.e., the capacitor bank with highest THD and voltage above a threshold). At 520 configuration data is accessed to determine whether an Automation Mode is engaged (e.g., as distinct from settings for Monitor Only or Manual). If not set to Automation Mode, then no action is taken. If set to Automation Mode, then at step 522, a message is sent to the capacitor bank control module 58 to switch out the identified capacitor bank 116 from the MV power line circuit 106 so as to decrease THD. The message may include information identifying the identified capacitor bank 116 and a control message (i.e., to switch out). The message may be received and translated by the capacitor bank control module 58, which may send a command to the identified capacitor bank 116 to switch out.

Figure 6:
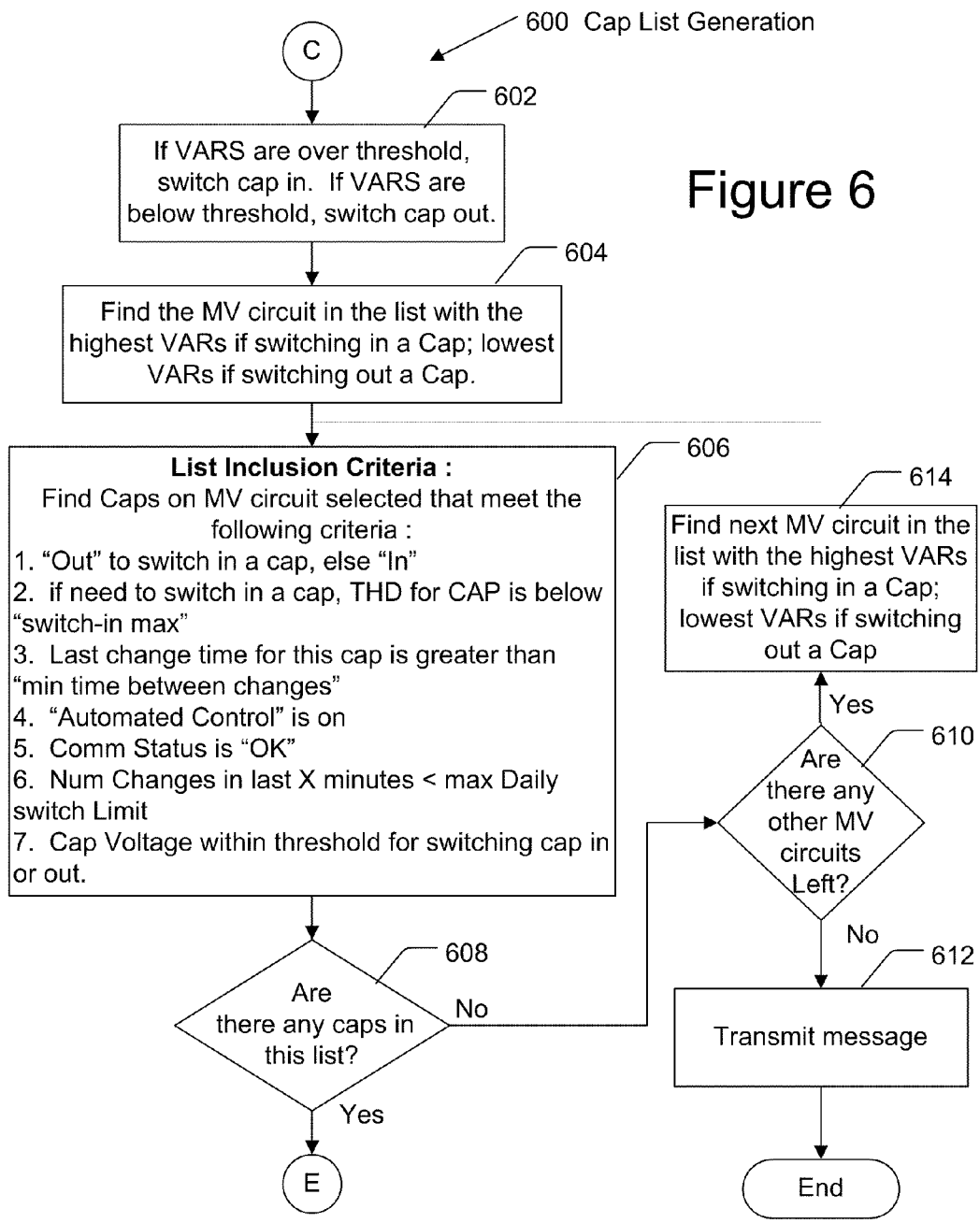
FIG. 6 is a flow chart of a capacitor bank list generation process for use in regulating power factor, in accordance with an example embodiment of the present invention.

In certain instances as described above, the action decision process 500 may trigger the execution of the capacitor bank list generation process 600 or 700. When Bus VAR (the measured (and, if applicable averaged) VAR supplied to the Bus) is determined to be beyond a threshold for a predetermined time period at 506, process 600 is performed to determine a list of capacitor banks that can be switched to improve the VARs of the Bus. FIG. 6 illustrates a capacitor bank list generation process 600 that may be implemented for controlling the power factor, according to an example embodiment of the present invention. The capacitor to be switched in or out is typically selected from the capacitor bank list. It is therefore desirable for the capacitor bank list to include only those capacitor banks that (1) can be switched (e.g., are in appropriate engagement status, in automation mode and communications viable); (2) if switched, do not cause other power parameters to fall outside of a threshold or, if already beyond a threshold, to worsen (e.g., THD and/or voltage are not beyond threshold); (3) if switched, would not put undue stress on the capacitor bank 116 (e.g., not too many switches recently or for the day). At 602 data of the Bus VARs is compared to a threshold value to determine whether the measured VARs are above a first VARs threshold value or below a second VARs threshold. If above the first VARs threshold, then the desired action is to switch a capacitor bank 116 into a MV power line circuit. If the Bus VARs are below the second VARs threshold value, then the desired action is to switch a capacitor bank 116 out of a MV power line circuit. If switching a capacitor bank 116 in, then at 604 the MV power circuit that is connected to the Bus having the highest VARs (e.g., as measured at the circuit breaker), and the capacitor banks 116 connected to such MV power line circuit, are identified. If switching a capacitor bank out, then at 604 the MV circuit having the lowest VARs, and the capacitor banks 116 connected to such MV circuit, are identified.

In this embodiment, an MV power line circuit 106 (consisting of three MV power line conductors) is selected, because typically each capacitor bank is connected to all three MV power line conductors 110. In an alternate embodiment in which the power distribution system includes capacitor banks that are connected to a single MV power line conductor, a power line conductor may be selected (instead of a MV power line circuit 106). In yet a further embodiment, in some instances an MV circuit 106 may be selected and in other instances an MV power line conductor 110 may be selected.

At 606, data of the capacitor banks 116 connected to the identified MV circuit is compared to various criteria to identify capacitor banks 110 that are eligible for the desired switching action (and to exclude those not eligible). If switching a capacitor bank 116 into a circuit, then only those capacitor banks 116 connected to that MV circuit 106 that are presently switched out are identified as eligible. If switching a capacitor bank out of a circuit, then only those capacitor banks 116 of that MV power line circuit 106 that are presently switched in are identified as eligible. In addition, if it is needed to switch in a capacitor bank, the system identifies those capacitor banks 116 where the THD is below a maximum THD threshold for switching in a capacitor bank 116 (this criterion is omitted for switching out a capacitor bank).

Another criterion ensures that a capacitor bank is not switched too soon (since its last switch). Specifically, the time elapsed since each capacitor bank 116 was last switched must satisfy a predetermined wait time. Thus, the time elapsed since each capacitor bank's last switching may be compared to a predetermined minimum wait time. In addition, only those capacitor banks 116 that are set to Automation Mode are eligible. Only those capacitor banks 116 having a satisfactory communication status are eligible. Another eligibility requirement is that the number of engagement changes (switches) of a capacitor bank 116 within a recent predetermined time period must be less than a predetermined maximum number of changes. Finally, to be eligible the capacitor bank voltage must not be beyond a threshold (e.g., must be between a first voltage and a second higher voltage wherein the voltage range is the range for switching capacitor banks for conventional power line voltage control purposes as previously described). Identification of the eligible capacitor banks may be determined by program code executing on a computer system and the order in which each criterion is applied is not crucial to many embodiments of the invention. In other embodiments, additional or fewer criteria may be used and/or different criteria may be used. Information is stored in memory identifying those capacitor banks 116 connected to the identified MV power line circuit 106 that are eligible for switching. In addition, the thresholds (e.g., voltages, THD, etc.) and minimum time periods may be stored in memory and vary for each capacitor bank based on the capacitor bank manufacturer and/or model, age, and/or on other criteria. As discussed above, in other embodiments the capacitor banks connected a selected power line conductor may be used to generate the list.

At 608 it is determined whether any capacitor banks 116 meet all the eligibility criteria. If so, then the capacitor selection process 800 (see FIG. 8) is performed. If no capacitor banks 116 meet the eligibility criteria, then at 610, it is determined whether there are any other MV circuits with capacitor banks 116 that may be evaluated. More specifically, the application monitors all of the MV circuits supplied power by the substation bus and attempts to switch a capacitor on the MV circuit that is most in need of having the switching performed (e.g. worst power factor, greatest Vars, or most in the lag if attempting to switch in a capacitor bank 116). If there are no capacitor banks eligible on that MV circuit the application proceeds to the MV power line circuit having the next worst power factor (or VARs), and so on. If there are no more MV power line circuits 106 to be evaluated, then at 612 a message is sent to the event management module 60 indicating that the desired action was to switch in (or out) a capacitor bank 116, but no capacitor banks 116 were found to be eligible. If there is another MV power line circuit 106 that may be evaluated, then at 614, from the remaining (unevaluated) MV power line circuits 106, the MV power circuit with the highest VARs is identified (if it is desired to switch in a capacitor bank 116) or the MV power line circuit having the lowest VARs is identified (if the desired action is to switch out a capacitor bank 116). In one example embodiment, the VARs of each power line conductor of each MV power line circuit is measured by sensors at the substation (such as at a circuit breaker of each MV power line) and the three power line conductor measurements of each MV circuit are averaged. The MV power line circuits are ranked (sorted) in descending order of VARs to determine the order in which each MV power line circuit may be modified. The capacitor banks 116 of the newly identified MV power line circuit 106 are evaluated at step 606 as described above. Each MV power line circuit coupled to the bus 105 may be evaluated until a capacitor bank 116 is identified in step 606 that may be switched according to the desired action. As discussed above, in other embodiments the VARs supplied to each power line conductor connected to the Bus may be sorted to select the power line conductor with the highest VARs (or lowest VARs) to determine the capacitor banks from which to generate the capacitor bank list.

Figure 7:
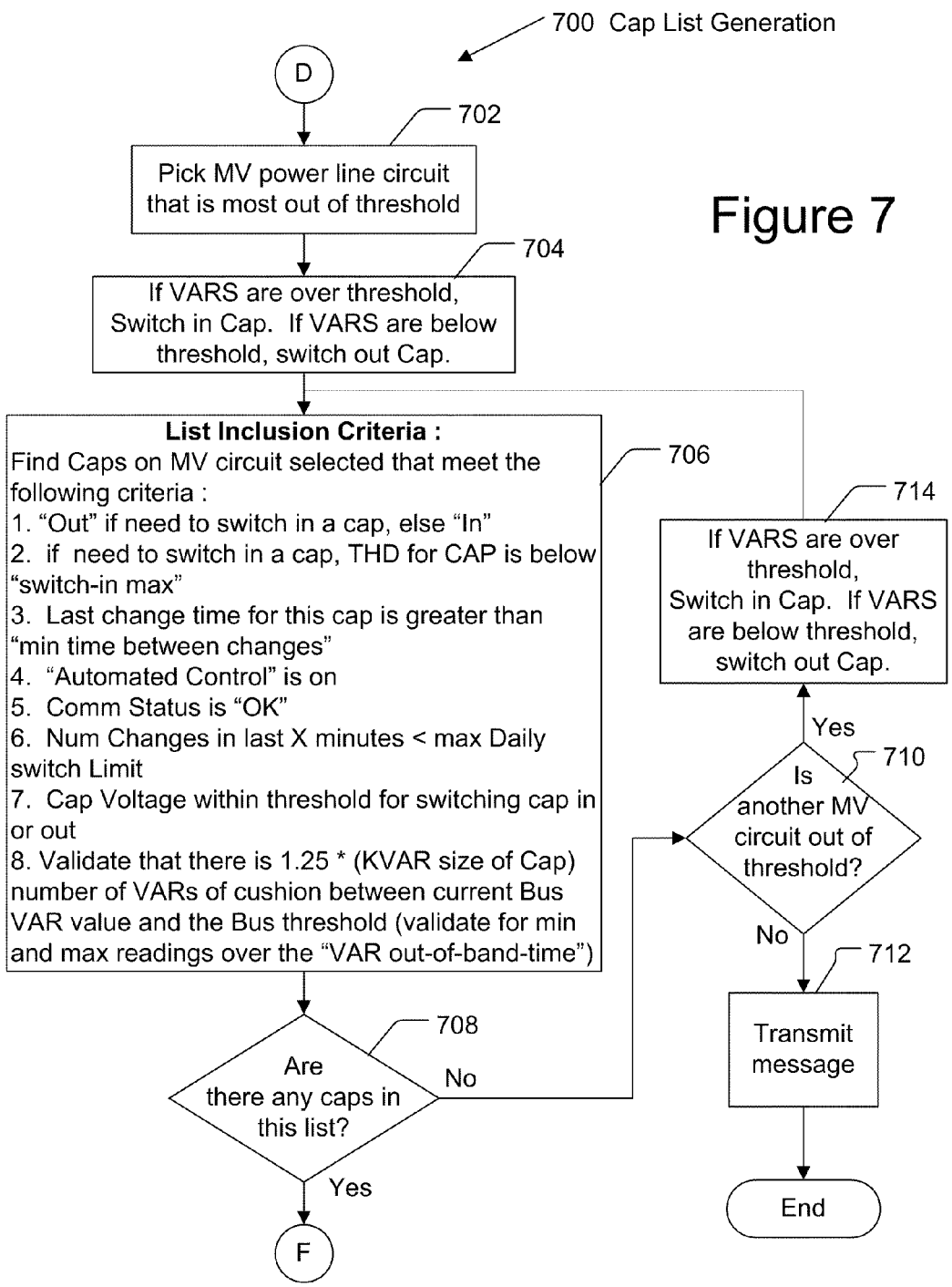
FIG. 7 is a flow chart of an additional capacitor bank list generation process for use in regulating power factor, in accordance with an example embodiment of the present invention.
Figure 8:
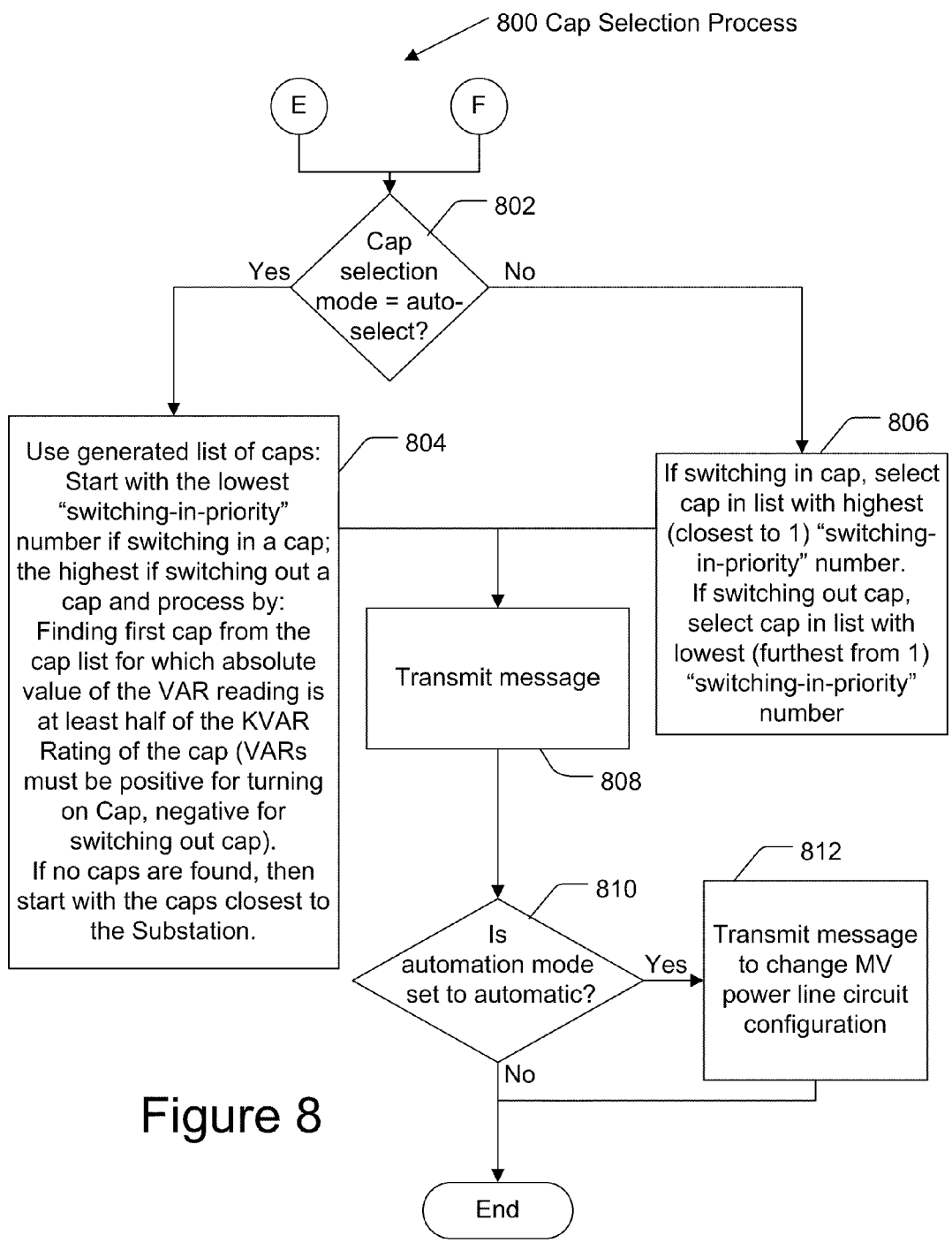
FIG. 8 is a flow chart of a capacitor bank selection process, in accordance with an example embodiment of the present invention.

When the VARs of a MV power line circuit 106 are determined to be beyond a threshold (and that the data is valid) at step 508 (see FIG. 5), process 700 may be performed. FIG. 7 depicts a capacitor bank list generation process 700 that may be implemented for regulating the VARs, according to an example embodiment of the present invention. At 702 the MV power line circuit that is most beyond a threshold is identified. At 704, it is determined if the VARs for the identified MV power line circuit is above or below a threshold in order to determine whether it is needed to switch in or out a capacitor bank, respectively.

At 706 data of the capacitor banks 116 on the MV power line circuit is compared with eligibility criteria as described above to identify those capacitor banks 116 (if any) that are eligible for the desired switching action. If switching a capacitor bank 116 into a circuit, then only those capacitor banks 116 of that MV power line circuit 106 that are presently switched out are identified as eligible. If switching a capacitor bank out of a circuit, then only those capacitor banks 116 of that MV power line circuit 106 that are presently switch in are identified as eligible. In addition, if it is needed to switch a capacitor bank in, the system identifies those capacitor banks 116 where the THD is below a maximum THD threshold for switching in a capacitor bank 116 (this criterion is omitted for switching a capacitor bank out). Another criterion ensures that a capacitor bank is not switched too soon (since its last switch). Specifically, the time elapsed since each capacitor bank 116 was last switched must satisfy a predetermined wait time. Thus, the time elapsed since each capacitor bank's last switching may be compared to a predetermined minimum wait time. In addition, only those capacitor banks 116 that are set to Automation Mode are eligible. Only those capacitor banks 116 having a satisfactory communication status are eligible. Another eligibility requirement is that the number of engagement changes (switches) of a capacitor bank 116 within a recent predetermined time period must be less than a predetermined maximum number of changes. In addition, to be eligible the voltage of a power line at the capacitor bank must not be beyond a threshold (e.g., must be between a first voltage and a second higher voltage wherein the voltage range is the range for switching capacitor banks for conventional power line voltage control purposes as previously described). Finally, to be eligible the process determines that there is a predetermined VARs margin (e.g., 1.25 multiplied by the KVAR size of the capacitor bank) between the present Bus VAR value and a Bus VAR threshold value and that the predetermined VARs margin has been present for a predetermined time period. This generally ensures that switching of the capacitor bank 116 does not cause the Bus VARs to move beyond a threshold. Identification of the eligible capacitor banks (as disclosed throughout) may be determined by program code executing on a computer system and the order in which each criterion is applied is not crucial to many embodiments of the invention. In other embodiments, additional or fewer criteria may be used and/or different criteria may be used. Information is stored in memory identifying those capacitor banks 116 connected to the identified MV power line circuit 106 that are eligible for switching. In addition, the thresholds (e.g., voltages, THD, etc.) and minimum time periods may be stored in memory and vary for each capacitor bank based on the capacitor bank manufacturer and/or model, age, and/or on other criteria.

In this embodiment, the capacitor banks 116 are selected for the list from the capacitor banks 116 connected to an MV power line circuit 106 (consisting of three MV power line conductors), because typically each capacitor bank is connected to all three MV power line conductors 110. In an alternate embodiment in which the power distribution system includes capacitor banks that are connected to a single MV power line conductor, the capacitor banks connected to a power line conductor may be used to generate the list (instead of those connected to a MV power line circuit 106). In yet a further embodiment, in some instances capacitor banks 116 connected an MV circuit 106 may be used and in other instances those connected to an MV power line conductor 110 may be used to generate the list.

At 708 it is determined whether any capacitor banks 116 meet all the eligibility criteria. If so, then the capacitor selection process 800 (see FIG. 8) is performed. If no capacitor banks 116 meet all the criteria, then at 710 it is determined whether there are any other MV power line circuits 106 whose VARs measurement is beyond a threshold. If there are no such other MV power line circuits, then at 712 a message is sent to the event management module 60 that the desired action was to switch a capacitor bank 116 in (or out) of a MV power line circuit 106, but that no capacitor banks 116 were found to be eligible. If there is another MV power line circuit 106 whose capacitor banks 116 may be evaluated, then the next MV power line circuit 106 is identified and at 714, data of the VARs for the newly identified MV power line circuit 106 is processed to determine whether the measured VARs is above or below a VAR threshold level. If the VARs are above a threshold, then the desired action is to switch in a capacitor bank 116. If it is below, then the desired action is to switch out a capacitor bank 116. The capacitor banks 116 along the identified MV power line circuit are then evaluated at step 706 as described above. Each MV power line circuit 106 that is out of tolerance is evaluated until a capacitor bank 116 is identified in step 706 that may be switched according to the desired action. As discussed above, in other embodiments the VARs supplied to each power line conductor connected to the Bus may be sorted to select the power line conductor with the highest VARs (or lowest VARs) to determine the MV power line circuit to modify.

When one of the capacitor bank selection processes 600/700 identifies a list of capacitor banks 116 that may be switched in or out, the capacitor bank selection process 800 is performed. The capacitor bank selection may be determined in one of a few different manners. For example, the selection may be based on a priority value (i.e., a switching-in priority) or based on an auto-selection process (discussed above). Switching-in-priority for each capacitor bank 116 may be set up by default to alternate among the MV power line circuits 106 coupled to the bus 105 and give higher priority to the capacitor banks 116 that are the farthest away from the bus 105 along the MV power line circuits 106. In some embodiments, the default priority may be set differently. Further in some embodiments, an operator or technician may program or otherwise set a different default priority order for the capacitor banks of each MV power line circuit 106. Note that in some instances a given capacitor bank's priority level may be lowered temporarily for some predetermined time (e.g., because it has recently been switched in or out under control of a separate mechanism to modify the voltage), as described above with the data collection methods 400.

At 802 the capacitor bank selection mode may be retrieved from memory to determine whether the system is currently configured for an automatic selection process. If it is configured for automatic selection, then at 804 the generated list of eligible capacitor banks is processed to select a capacitor bank. Each capacitor bank 116 in the eligible capacitor bank list may have a switching-in priority level as described above. When switching out a capacitor bank 116, the selection process begins with the capacitor bank 116 from the list having the lowest switching-in-priority value. When switching in a capacitor bank 116, the selection process begins with the capacitor bank 116 having the highest switch-in-priority value. Progressing in the direction of priority determined by whether switching a capacitor bank in or out, the first capacitor bank is identified for which the absolute value of its associated the VARs is above a threshold value (e.g., at least half of the KVAR rating of the capacitor bank 116) or (alternately) the highest. It is worth noting that VARs must be positive for switching in a capacitor bank and negative for switching out a capacitor bank. If no capacitor banks 116 in the list are found satisfying this criterion, then the process proceeds by identifying the capacitor banks closest to the power substation and selecting one (e.g., the closest) to switch.

At 802 if the system is found not to be currently configured for an automatic selection process, then at 806 a different selection process may be used. If switching in a capacitor bank 116, then the capacitor bank 116 in the list is selected that has the highest (e.g., closest to 1) switching-in-priority level. If switching out a capacitor bank, then the capacitor bank in the list is selected that has the lowest (e.g., furthest from 1) switching-in-priority level.

Following the capacitor bank selection at 802 or 804, at 808 a message is transmitted to the event management control module 60 identifying the selected capacitor bank 116 and the action to be taken (i.e., switch in or out). In some embodiments the message also may identify the criteria met by the selected capacitor bank 116, (e.g., highest/lowest switch-in priority). At 810 it is determined whether automatic mode is active. If not active, no further action is taken (although in some embodiments a notification may be provided to allow personnel to take action). If automatic mode is set, then at 812 a message is sent to the capacitor control module 58 (see FIG. 1) to change the MV power line circuit 106 configuration by switching the selected capacitor bank 116 in or out.

In an alternate embodiment, the MV power line circuits and Bus may be modeled according to a simulated switching of the selected capacitor bank 116, prior to the actual switching. Such modeling may be displayed on a display and provide an indication of the various parameters at various locations on the power distribution system such as providing an estimate of the voltage, THD, power factor, and/or VARs at the Bus, at each MV power line (at the circuit breaker 108), and at one or more (or at each) capacitor bank 116. If the simulation indicates that one or more parameters (e.g., voltage, THD, VARs, power factor) may be caused to move beyond a threshold by the switching of the selected capacitor bank 116, the display may provide a visual (and/or audible) alarm indicating so and switching of a different capacitor bank 116 from the list may be simulated. If an alarm is provided, another capacitor bank may be selected and simulated.

Figure 9:
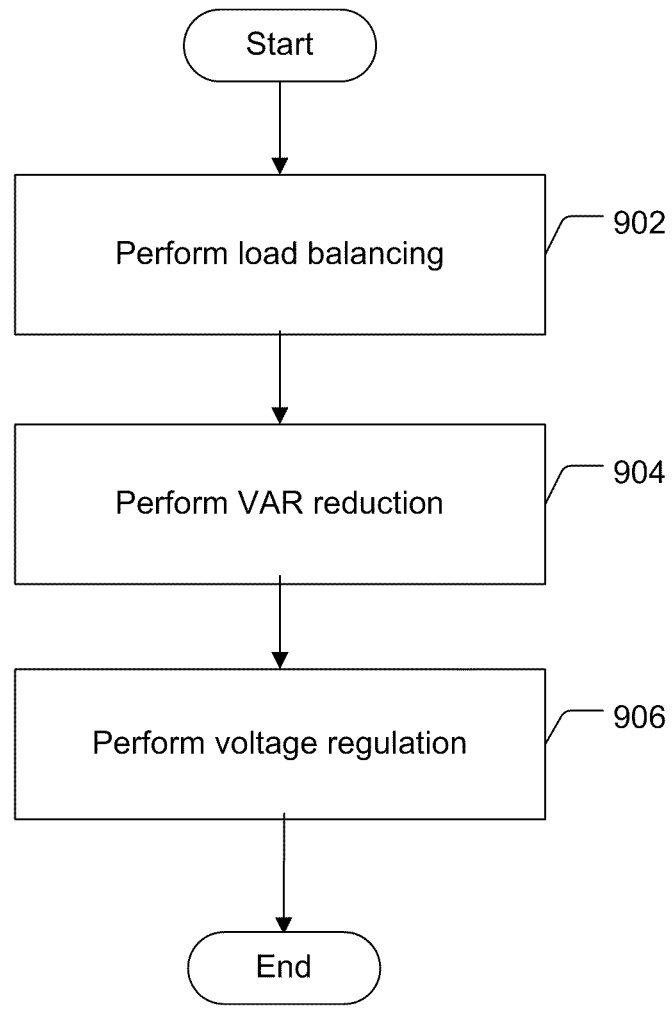
FIG. 9 is a flow chart of a power distribution system management process, in accordance with an example embodiment of the present invention.

For some power distribution systems, it may be desirable to regularly execute a suite of software applications in order to manage the power distribution system to provide reliable power to customers efficiently. Referring to FIG. 9, an example process may include load balancing at 902, which may result in actuation of one or more switches. At 904, the VAR application may be executed to reduce overall power consumption by reducing VARs, which may result in the switching in or out of one or more capacitor banks and/or performing other applications. At 906, voltage regulation may be performed in order to reduce the overall power consumption, which typically includes reducing the voltage to a level slightly above regulatory requirements. For example, the dynamic voltage optimization application may cause changes in the voltage outputs of one or more voltage regulators, substation voltage control devices (e.g., load tap changers), and/or the switching in or out of one or more capacitor banks. Each of these processes 902, 904, and 906 may additionally require execution of a power flow simulation application and may be repeated regularly. In some embodiments, the order of these processes may be necessary and in other embodiments the order may not be important or necessary (and some processes may be performed more often than others).

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method, implemented at least in part by a computer system, for modifying the volt-ampere reactive (VARs) in a power distribution system, comprising: determining the VARs at a location on the power distribution system; based on the determined VARs, determining whether to modify the VARs; if it is determined to modify the VARs, identifying a plurality a capacitor banks connected to a power line; from the identified plurality of capacitor banks, generating a list of eligible capacitor banks that satisfy inclusion criteria; if the list of eligible capacitor banks includes at least one capacitor bank: selecting a capacitor bank from the list of eligible capacitor banks; and transmitting a switching command for the selected capacitor bank, wherein for each of a multitude of the plurality of capacitor banks: receiving data of the total harmonic distortion (THD) at the capacitor bank; and wherein said generating comprises comparing the received THD for each capacitor bank with a maximum THD.

2. The method according to claim 1, further comprising for each of a multitude of the plurality of capacitor banks: receiving data of a voltage at the capacitor bank; and wherein said generating comprises determining that the voltage at the capacitor bank is not beyond a threshold voltage.

3. The method according to claim 2, further comprising for each of a multitude of the plurality of capacitor banks: receiving data of the total harmonic distortion (THD) at the capacitor bank; and wherein said generating comprises comparing the received THD for each capacitor bank with a maximum THD.

4. The method according to claim 1, wherein said transmitting a switching command comprises transmitting the switching command via a communication path that includes a wireless link.

5. The method according to claim 1, wherein the location of the power line comprises a location where power is supplied to a substation Bus.

6. The method according to claim 1, wherein the location of the power line comprises a location at which power is supplied to a medium voltage power line.

7. A method, implemented at least in part by a computer system, for modifying the volt-ampere reactive (VARs) in a power distribution system, comprising: determining the VARs at a location on the power distribution system; based on the determined VARs, determining whether to modify the VARs; if it is determined to modify the VARs, identifying a plurality a capacitor banks connected to a power line; from the identified plurality of capacitor banks, generating a list of eligible capacitor banks that satisfy inclusion criteria; if the list of eligible capacitor banks includes at least one capacitor bank: selecting a capacitor bank from the list of eligible capacitor banks; and transmitting a switching command for the selected capacitor bank, wherein said generating a list of eligible capacitor banks comprises for each capacitor bank of the plurality of capacitor banks: determining a quantity of switches within a most recent predetermined time period; comparing the quantity of switches of each capacitor bank with a threshold number; and excluding the capacitor bank from the list of eligible capacitor banks if the quantity of switches of the capacitor bank is greater than the threshold number.

8. A method, implemented at least in part by a computer system, for modifying the volt-ampere reactive (VARs) in a power distribution system, comprising: determining the VARs at a location on the power distribution system; based on the determined VARs, determining whether to modify the VARs; if it is determined to modify the VARs, identifying a plurality a capacitor banks connected to a power line; from the identified plurality of capacitor banks, generating a list of eligible capacitor banks that satisfy inclusion criteria; if the list of eligible capacitor banks includes at least one capacitor bank: selecting a capacitor bank from the list of eligible capacitor banks; and transmitting a switching command for the selected capacitor bank, wherein said generating a list of eligible capacitor banks comprises for each capacitor bank of the plurality of capacitor banks: collecting a voltage at the capacitor bank; determining whether the voltage is beyond a threshold voltage; and excluding the capacitor banks from the list of eligible capacitor banks if the voltage at the capacitor bank is beyond the threshold voltage.

9. A method, implemented at least in part by a computer system, for modifying the volt-ampere reactive (VARs) in a power distribution system, comprising: determining the VARs at a location on the power distribution system; based on the determined VARs, determining whether to modify the VARs; if it is determined to modify the VARs, identifying a plurality a capacitor banks connected to a power line; from the identified plurality of capacitor banks, generating a list of eligible capacitor banks that satisfy inclusion criteria; if the list of eligible capacitor banks includes at least one capacitor bank: selecting a capacitor bank from the list of eligible capacitor banks; and transmitting a switching command for the selected capacitor bank, wherein said generating a list of eligible capacitor banks comprises for each capacitor bank of the plurality of capacitor banks: determining a time period having an elapsed since a most recent switching of the capacitor bank; comparing the time period since the most recent switching of each capacitor bank with a minimum wait period; and excluding the capacitor bank from the list of eligible capacitor banks if the time period since the most recent switching of the capacitor banks is less than the minimum wait period.

10. A method, implemented at least in part by a computer system, for modifying the volt-ampere reactive (VARs) in a power distribution system, comprising: determining the VARs at a location on the power distribution system; based on the determined VARs, determining whether to modify the VARs; if it is determined to modify the VARs, identifying a plurality a capacitor banks connected to a power line; from the identified plurality of capacitor banks, generating a list of eligible capacitor banks that satisfy inclusion criteria; if the list of eligible capacitor banks includes at least one capacitor bank: selecting a capacitor bank from the list of eligible capacitor banks; and transmitting a switching command for the selected capacitor bank, wherein said generating a list of eligible capacitor banks comprises excluding a capacitor bank from the list of eligible capacitor banks if the capacitor bank does not presently having a viable communication capability.

11. A method, implemented at least in part by a computer system, for modifying the volt-ampere reactive (VARs) in a power distribution system, comprising: determining the VARs at a location on the power distribution system; based on the determined VARs, determining whether to modify the VARs; if it is determined to modify the VARs, identifying a plurality a capacitor banks connected to a power line; from the identified plurality of capacitor banks, generating a list of eligible capacitor banks that satisfy inclusion criteria; if the list of eligible capacitor banks includes at least one capacitor bank: selecting a capacitor bank from the list of eligible capacitor banks; and transmitting a switching command for the selected capacitor bank, further comprising: determining a Bus VARs value; and wherein said generating a list of eligible capacitor banks comprises for each of the plurality of capacitor banks: determining whether a predetermined margin, that is based on a rating of the capacitor bank, exists between the Bus VARs and a Bus VARs threshold value; and excluding any capacitor banks from the first list if the predetermined margin does not exist between the VARs supplied to a substation bus and the Bus Var threshold value.

12. A computer program product stored on a tangible computer-readable medium comprising computer-program instructions executable by one or more processors of a computer system, the computer-program instructions comprising instructions for performing a method for modifying the reactive power in a power distribution system, the method comprising: determining a group of the capacitor banks connected to a medium voltage power line; receiving data of a voltage at each capacitor bank of the group of capacitor banks; determining whether the voltage at each capacitor bank of the group of capacitor banks is beyond a threshold voltage; generating a list of eligible capacitor banks from the group of capacitor banks; wherein said list excludes any capacitor bank at which the voltage is beyond the threshold voltage; selecting a capacitor bank from the list of eligible capacitor banks; and outputting a switching command for the selected capacitor bank.

13. The computer program product according to claim 12, wherein the method further comprises: receiving data of a total harmonic distortion (THD) at one or more of the group of capacitor banks; and wherein said generating the list comprises comparing the received THD with a maximum THD for each capacitor bank of the one or more of the group of capacitor banks.

14. The computer program product according to claim 12, wherein said generating the list of eligible capacitor banks comprises for each capacitor bank: determining a time period having an elapsed since a most recent switching of the capacitor bank; comparing the time period since the most recent switching of the capacitor bank with a minimum wait period; and excluding from the list of eligible capacitor banks any capacitor bank having a time period since the most recent switching that is less than the minimum wait period.

15. The computer program product according to claim 12, wherein said generating the list of eligible capacitor banks comprises for each capacitor bank: determining a quantity of switches within a most recent predetermined time period; comparing the quantity of switches of each capacitor bank with a threshold number; and excluding from the list of eligible capacitor banks any capacitor bank having quantity of switches that is greater than the threshold number.

16. The computer program product according to claim 12, wherein said generating the list of eligible capacitor banks comprises: determining whether a predetermined margin, that is based on a rating of the capacitor bank, exists between the Bus VARs and a Bus VARs threshold value; and excluding any capacitor bank from the first list if the predetermined margin does not exist between the Bus VARs and the Bus Var threshold value.

17. The computer program product according to claim 12, wherein the location of the power line comprises a location at which power is supplied to a medium voltage power line.

18. The computer program product according to claim 12, wherein the method further comprises: determining a reactive power at a location on the power distribution system; and based on the reactive power, determining whether to change the engagement status of any of the plurality of capacitor banks.

19. A method, implemented at least in part by a computer system, for modifying the volt-ampere reactive (VARs) in a power distribution system that includes a plurality of power line circuits, comprising: determining the VARs supplied to a substation bus of the power distribution system; determining whether the VARs supplied to the bus are beyond a first threshold; if the VARs supplied to the bus are beyond the first threshold: selecting a first power line circuit of the plurality of power line circuits; identifying one or more capacitor banks associated with the first power line circuit; from the one or more capacitor banks associated with the first power line circuit, generating a first list of eligible capacitor banks that satisfy first inclusion criteria; if the first list of eligible capacitor banks includes at least one capacitor bank, selecting a first capacitor bank from the first list of eligible capacitor banks; and transmitting a switching command for the first capacitor bank.

20. The method according to claim 19, further comprising if the VARs supplied to the bus are not beyond the first threshold: determining whether the VARs of any of the plurality of power line circuits is beyond a second threshold; if the VAR of any of the plurality of power line circuits is beyond the second threshold: selecting one power line circuit from the plurality of power line circuits having the VAR beyond the second threshold; identifying one or more capacitor banks associated with the one power line circuit; from the one or more capacitor banks associated with the one power line circuit, generating a second list of eligible capacitor banks that satisfy second inclusion criteria; if the second list of eligible capacitor banks includes at least one capacitor bank, selecting a second capacitor bank from the second list of eligible capacitor banks; and transmitting a switching command for the second capacitor bank.

21. The method according to claim 19, wherein if the first list of eligible capacitor banks does not includes at least one capacitor bank: selecting a second power line circuit of the plurality of power line circuits; identifying one or more capacitor banks associated with the second power line circuit; from the one or more capacitor banks associated with the second power line circuit, generating a second list of eligible capacitor banks that satisfy second inclusion criteria; if the second list of eligible capacitor banks includes at least one capacitor bank, selecting a second capacitor bank from the second list of eligible capacitor banks; and transmitting a switching command for the second capacitor bank.

22. The method according to claim 19, wherein said generating a list of eligible capacitor banks comprises for at least one of the one or more capacitor banks: collecting a voltage at the capacitor bank; determining whether the voltage is beyond a threshold voltage; and excluding from the list of eligible capacitor banks any capacitor bank having a voltage that is beyond the threshold voltage.

23. The method according to claim 19, further comprising: receiving data of a total harmonic distortion (THD) at some of the one or more capacitor banks; and wherein said generating comprises comparing the received THD with a maximum THD for each capacitor bank.

24. The method according to claim 19, wherein said generating the first list of eligible capacitor banks comprises for each capacitor bank of the one or more capacitor banks: determining a time period having an elapsed since a most recent switching of the capacitor bank; comparing the time period since the most recent switching of the capacitor bank with a minimum wait period; and excluding from the list of eligible capacitor banks any capacitor bank having a time period since the most recent switching that is less than the minimum wait period.

25. The method according to claim 19, wherein said generating the first list of eligible capacitor banks comprises for each capacitor bank: determining a quantity of switches within a most recent predetermined time period; comparing the quantity of switches of each capacitor bank with a threshold number; and excluding from the list of eligible capacitor banks any capacitor bank having quantity of switches that is greater than the threshold number.

26. The method according to claim 19, further comprising: determining a Bus VARs value; and wherein said generating the first list of eligible capacitor banks comprises for each capacitor bank of the one or more capacitor banks: determining whether a predetermined margin, that is based on a rating of the capacitor bank, exists between the Bus VARs and a Bus VARs threshold value; and excluding any capacitor banks from the first list if the predetermined margin does not exist between the VARs supplied to a substation bus and the Bus Var threshold value.

27. The method according to claim 19, further comprising: determining the VAR at the capacitor banks in the first list; wherein said selecting a first capacitor bank from the first list of eligible capacitor banks comprises: identifying a capacitor bank from the first list for which the VAR at the capacitor bank is at least predetermined percentage of a rating for the capacitor bank.

28. A computer program product stored on a tangible computer-readable medium comprising computer-program instructions executable by one or more processors of a computer system, the computer-program instructions comprising instructions for performing a method for modifying the reactive power in a power distribution system, the method comprising: determining a group of the capacitor banks connected to a medium voltage power line; receiving data of a total harmonic distortion (THD) at each capacitor bank of the group of capacitor banks; determining whether the THD at each capacitor bank of the group of capacitor banks is beyond a threshold THD; generating a list of eligible capacitor banks from the group of capacitor banks; wherein said list excludes any capacitor bank at which the THD is beyond the threshold THD; selecting a capacitor bank from the list of eligible capacitor banks; and outputting a switching command for the selected capacitor bank.

29. The computer program product according to claim 28, wherein said generating the list of eligible capacitor banks comprises for each capacitor bank: determining a time period having an elapsed since a most recent switching of the capacitor bank; comparing the time period since the most recent switching of the capacitor bank with a minimum wait period; and excluding from the list of eligible capacitor banks any capacitor bank having a time period since the most recent switching that is less than the minimum wait period.

30. The computer program product according to claim 28, wherein said generating the list of eligible capacitor banks comprises for each capacitor bank: determining a quantity of switches within a most recent predetermined time period; comparing the quantity of switches of each capacitor bank with a threshold number; and excluding from the list of eligible capacitor banks any capacitor bank having quantity of switches that is greater than the threshold number.

\* \* \* \* \*